(12) United States Patent
Ishikawa et al.

(10) Patent No.: US 7,013,776 B2
(45) Date of Patent: *Mar. 21, 2006

(54) DEVICE FOR CUTTING OPTICAL FIBER AND A METHOD FOR CUTTING OPTICAL FIBER

(75) Inventors: Ryuichi Ishikawa, Toyohashi (JP); Kyosuke Harada, Toyohashi (JP); Taichi Masuda, Sakura (JP)

(73) Assignee: Mitsubishi Rayon Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,581

(22) Filed: Sep. 25, 1998

(65) Prior Publication Data
US 2002/0038593 A1    Apr. 4, 2002

(51) Int. Cl.
*B26D 5/08* (2006.01)

(52) U.S. Cl. .............................. 83/13; 83/613; 83/628; 83/950; 476/31

(58) Field of Classification Search .......... 83/613–641, 83/950, 318, 337, 571, 572, 573, 563, 628, 83/629, 913, 450, 171, 16; 29/564.4, 566.3; 225/96.2, 96, 2, 93, 103; 81/628, 9.51; 476/31, 32, 61, 59; 30/140
See application file for complete search history.

(56) References Cited

U.S. PATENT DOCUMENTS

| | | | | |
|---|---|---|---|---|
| 2,454,241 A | * | 11/1948 | Wennerberg | 83/355 |
| 2,563,986 A | * | 8/1951 | Bauer | 83/24 |
| 2,591,004 A | * | 4/1952 | Phillips | 409/285 |
| 3,442,168 A | * | 5/1969 | Gatto | 83/564 |
| 3,498,166 A | * | 3/1970 | Pook | 83/913 |
| 3,515,021 A | * | 6/1970 | Walus et al. | 83/159 |
| 3,740,848 A | * | 6/1973 | Lindley | 83/629 |
| 3,768,359 A | * | 10/1973 | Koefferlein | 83/628 |
| 3,783,726 A | * | 1/1974 | Marks | 83/355 |
| 3,918,313 A | * | 11/1975 | Montagnino | 74/393 |
| 4,007,520 A | * | 2/1977 | Kraus | 83/169 |
| 4,020,880 A | * | 5/1977 | Heller et al. | 140/140 |
| 4,230,010 A | * | 10/1980 | Guenthner | 83/602 |
| 4,262,417 A | * | 4/1981 | Logan et al. | 30/140 |
| 4,474,319 A | * | 10/1984 | Walker | 225/96.5 |
| 4,495,699 A | * | 1/1985 | Oakes | 408/710 |
| 4,530,452 A | * | 7/1985 | Balyasany et al. | 225/96 |
| 4,621,754 A | * | 11/1986 | Long et al. | 225/2 |
| 4,674,666 A | * | 6/1987 | Balyasny | 225/101 |
| 4,790,465 A | * | 12/1988 | Fellows et al. | 225/2 |

(Continued)

FOREIGN PATENT DOCUMENTS

JP    62-15762    4/1987

(Continued)

*Primary Examiner*—Allan N. Shoap
*Assistant Examiner*—Jason Prone
(74) *Attorney, Agent, or Firm*—Oblon, Spivak, McClelland, Maier & Neustadt, P.C.

(57) ABSTRACT

An optical fiber cutting device provided with a speed reducing part which transmits drive force by reducing the drive speed of the external drive force, a drive force transmission part which transmits the drive force from the speed reduction part to the cutting blade holder, a cutting blade holder, a cutting blade which is held by the cutting blade holder and moves to the cutting position along with said cutting blade holder, and an optical fiber supporter which supports the optical fiber so as to be perpendicular to said cutting blade at the cutting position.

3 Claims, 2 Drawing Sheets

U.S. PATENT DOCUMENTS

| | | | |
|---|---|---|---|
| 5,235,887 A * | 8/1993 | Moriya | 83/628 |
| 5,361,663 A * | 11/1994 | Hayes et al. | 83/522.19 |
| 5,501,385 A * | 3/1996 | Halpin | 225/96 |
| 5,565,122 A * | 10/1996 | Zinnbauer et al. | 83/15 |
| 5,570,728 A * | 11/1996 | Benedict et al. | 83/80 |
| 5,850,773 A * | 12/1998 | Burns | 83/159 |
| 5,896,786 A * | 4/1999 | Akita | 81/9.41 |
| 5,974,930 A * | 11/1999 | Longrod | 83/629 |
| 6,024,004 A * | 2/2000 | Kosiarski et al. | 83/879 |
| 6,109,154 A * | 8/2000 | Miyatsu et al. | 83/629 |
| 6,148,708 A * | 11/2000 | Pfeiffer | 83/628 |
| 6,152,007 A * | 11/2000 | Sato | 83/629 |
| 6,598,508 B1 * | 7/2003 | Ishikawa et al. | 83/628 |
| 6,598,774 B1 * | 7/2003 | Kazama et al. | 225/96.5 |
| 6,688,207 B1 * | 2/2004 | Tabeling | 225/103 |
| 6,695,191 B1 * | 2/2004 | Tabeling | 225/103 |

FOREIGN PATENT DOCUMENTS

| | | |
|---|---|---|
| JP | 62-57001 | 11/1987 |
| JP | 5-75703 | 10/1993 |
| JP | 7-26802 | 5/1995 |

* cited by examiner

DEVICE FOR CUTTING OPTICAL FIBER AND A METHOD FOR CUTTING OPTICAL FIBER

BACKGROUND OF THE INVENTION

1. Field of the Invention

The present invention relates to an optical fiber cutting device and optical fiber cutting method for smoothly cutting optical fibers

2. Description of the Related Art

Plastic optical fibers (referred to as "optical fibers" hereinbelow) are widely used for optical communication, optoelectric switching, etc. In these areas of usage, optical fibers are connected to other optical fibers and to optical receiving and emitting elements. In this situation, the end surface of the optical fiber must be smooth because the condition of the end surface of the optical fiber influences the transmission loss of the light.

Conventionally, in order to make the end surface of the optical fiber smooth, optical polishing and mirror surface transfer processing are carried out after cutting, as disclosed, for example, in Japanese Patent Application, Second Publication, No. Sho 62-57001 (1987). However, these operations have the drawback that their operability is low.

Thus, devices which omit this kind of end surface smooth processing and, obtain a sufficiently smooth end surface by cutting with the object of improving operability, are disclosed, for example, in Japanese Utility Model, Second Publication, No. Sho 62-15762 and Japanese Utility Model, First Publication, No. Hei 5-75703. The device disclosed in Japanese Utility Model, Second Publication, No. Sho 62-15762, is a cutting device provided with a pair of side walls having insertion holes for supporting the optical fiber and one cutting blade, and obtains a smooth end surface by precisely moving the cutting blade. In the device disclosed in Japanese Utility Model, First Publication, No. Hei 5-75703, a cutting blade with a fan shape set at 30–50°, thereby suppressing damage of the blade.

However, the device in Japanese Utility Model, Second Publication, No. Sho 62-15762 can make the end surface of the optical fiber sufficiently smooth, but it has the drawback that if the cutting blade is thin, the cutting blade will deteriorate easily. In addition, the device disclosed in Japanese Utility Model, First Publication, No. Hei 5-75703 has the drawback that half of the end surface of the optical fiber is in a cleaved state because the cutting weight rapidly decreases after the cutting blade transits the center of the optical fiber.

In addition, a small optical fiber cutting device which can obtain a smooth end surface is disclosed in Japanese Utility Model, First Publication, No. Hei 7-26802. In this cutting device, an optical fiber is clipped and cut by manually rotating on the center of a fulcrum at least one of an optical fiber anchoring member or a blade support member which supports the blade, and between the optical fiber anchoring member and the blade support member, an elastic body such as a spring is used. Because of this, the elastic strength of the elastic body increases as the cutting progresses, and as a result, the speed of the movement of the cutting blade decreases. In addition, the speed of the movement of the cutting blade can be adjusted so as to slow down after completing the cutting of half of the cross-section area of the optical fiber.

However, in this cutting device, the cutting speed depends on the size of the manual force applied at the time of cutting. Thus, the cutting speed is irregular, and stable cutting cannot be carried out. Also, there are the problems that the optical fiber may be cut at an inappropriate cutting speed. Because of the instability or inappropriateness of the cutting speed, the cut surface may be insufficiently smooth.

In summary, up to the present, an optical fiber cutting device and an optical fiber cutting method wherein the cutting blade deteriorates with difficulty and the smooth entire end surface of the optical fiber can be obtained and the optical fiber can be cut stably have not been proposed.

SUMMARY OF THE INVENTION

The optical fiber cutting device of the present invention provides a speed reduction part which transmits drive force by reducing the drive speed of the external drive force, a drive force transmission part which transmits the drive force from the speed reduction part to the cutting blade holder, a cutting blade holder, a cutting blade which is held by the cutting blade holder and moves with the cutting blade holder to the cutting position, and an optical fiber supporter which holds the optical fiber so as to be perpendicular to the cutting blade at the cutting position.

In addition, if cutting blade having a blade thickness of α (mm) is used, and this cutting blade is moved at a speed of β (mm/minute), α and β are set so as to fulfill the following expression (1):

$$0 \leq \beta \leq -253\alpha + 65 \qquad\qquad \text{Exp.(1)}$$

In addition, it is further preferable that said drive force be provided by a rotating motor, and that said speed reduction part be a set of speed reduction gears which reduces the rotation speed of the above motor, and further, that said drive force transmission part comprise a cam which rotates along with the rotation of said set of speed reduction gears and a cam follower which moves rectilinearly along with the rotation of said cam.

DESCRIPTION OF THE PREFERRED EMBODIMENTS

Figure 1:
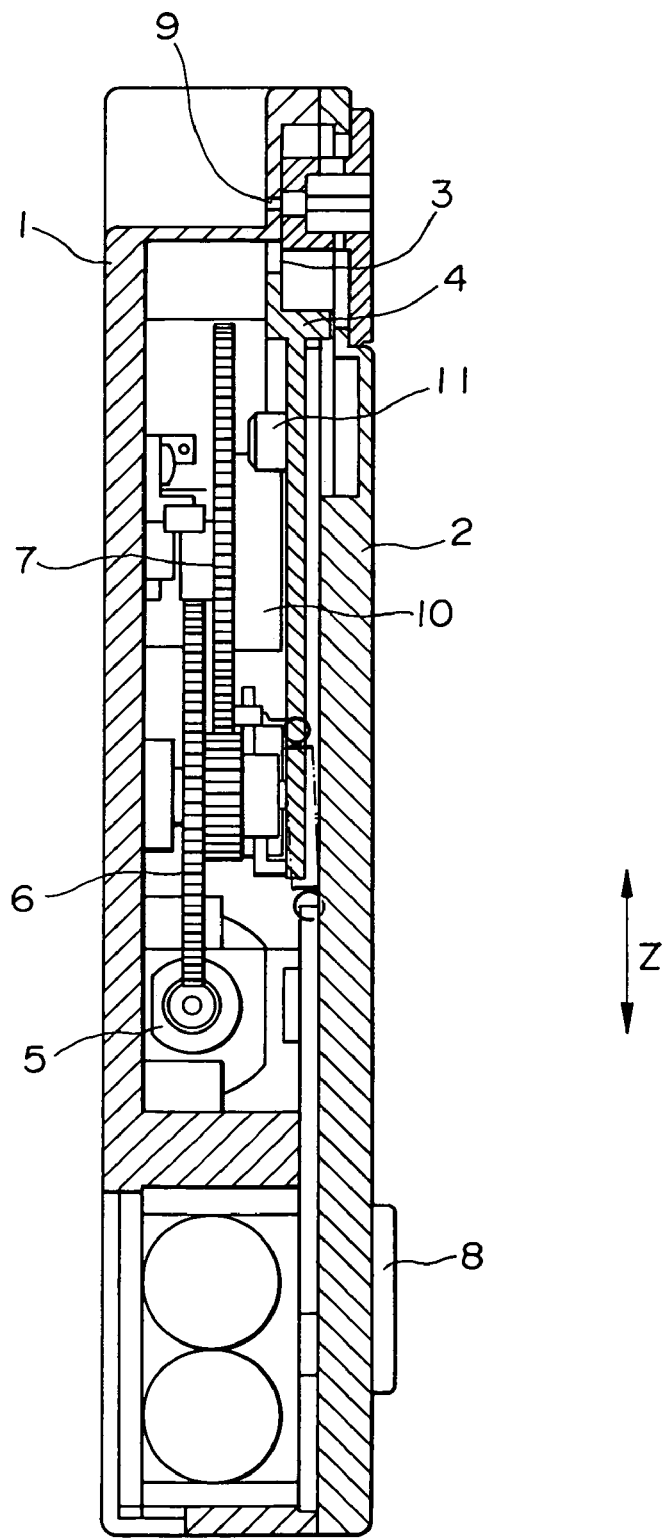
FIG. 1 is a top view of a cross-section of the optical fiber cutting device of the present invention.

In the process of cutting the optical fiber, the cutting blade contacts the circumferential part of the optical fiber and then, because the cutting area increases until the middle, the cutting weight is increased. After the cutting blade transits the center part of the optical fiber, because, contrarily, the cutting area decreases, the cutting weight is decreased. At this time, if applying the same force as has been necessary in cutting when the cutting blade has arrived at the center, after the cutting blade transits the center, the cutting speed increases because the force per unit of area increases. If the cutting speed becomes too fast, the cut surface of the optical fiber will be in a cleaved state, and will lose its smoothness.

In the present invention, by reducing an amount of a drive force applied to the cutting blade by the drive force transmission part after it transits the center of the optical fiber, stopping of the acceleration of the cutting blade after it transits the center of the optical fiber is achieved, thus cleaving of the end surface of the cut optical fiber can be prevented, and the stress on the cutting blade during cutting can be decreased. By making the degree of the reduction change depending on the position of the cutting blade in the direction of a diameter of a cross section of the optical fiber, and by using a speed reduction part which can maintain the speed of movement of the cutting blade almost always constant, these effects can be further increased.

Moreover, it is not necessary that the device of the present invention be completely formed in one device, but can comprise an arrangement of a plurality of devices.

It is possible to use, for example, a stainless steel blade as the cutting blade in the present invention. The shape of the cross-section of the cutting blade can have linear sides, as in generally the case, or other shapes, for example, a side with a fan shape. In order to cut the optical fiber as smoothly as possible, the thickness of the blade at the edge of the cutting blade (referred to as the "blade thickness" below) should be as thin as possible, and additionally, the angle formed by both sides of the cutting blade along the edge should be as small as possible. However, as the blade becomes thinner, or as the blade angle gets smaller, the durability (product life) decreases, and thus the blade thickness and blade angle must be determined according to the cost when cutting the optical fiber and the smoothness of the end surface of the optical fiber which is required. In addition, as will be explained later, because the degree of the smoothness of the optical fiber and the deterioration of the cutting blade is influenced by the speed of movement of the cutting blade as well, it is preferable to determine the blade angle and blade thickness taking into account the speed of the movement of the cutting blade. In addition, the smoothness of the end surface of the optical fiber and the durability of the cutting blade are greatly improved by heating the cutting blade during cutting.

As the drive force necessary for cutting, the rotating force of a motor, for example, is representative, but other driving forces, for example, manual driving forces, are possible. The drive speed of this kind of drive force is reduced to the desired speed for cutting the optical fiber by the speed reduction part, and is transmitted to the drive force transmission part. The speed reduction part can be constructed, for example, from an arrangement of gears of differing diameters. In this case, when gears and a cam disposed on the same axis of a gear can be used together, it is possible to control the speed of the movement of the cutting blade with even further accuracy.

In the case of a drive force which does not have a high speed, for example, manual force, as a speed reduction part, it is possible to attain the desired speed by disposing a speed control apparatus, such as a damper or a cam on the part which transmits the drive force.

Moreover, when using manual force as the driving force, the drive speed will vary depending on differences between individuals, and in addition, the same person may change the drive speed between the beginning of the cutting and the end of the cutting. However, in actual practice this problem will not arise because it is possible to make the absolute value of the amount of change in the speed small if the drive speed is reduced at a constant rate.

The drive force transmission part transmits the drive force from the speed reduction part to the cutting blade holder. The cutting blade holder holds the cutting blade, and can move in a predetermined direction. When the direction of the drive force and the direction of the movement of the cutting blade are different, the direction of the force can be changed in the drive force transmission part. For example, in contrast to the output from the speed reduction part which has a circumferential direction, when the cutting blade needs to be moved in a rectilinear direction, a cam and a cam follower which is arranged so as to contact with the cam and moves in a rectilinear direction along with the rotation of the cam are used, and the cutting blade holder is anchored to the cam follower. In this state, by making the cam rotate, the cam presses on the cam follower, and the cutting blade holder moves in the rectilinear direction, the result being that the cutting blade arrives at the cutting position.

The optical fiber supporter anchors the optical fiber perpendicular to the cutting blade in the cutting position so as not to move during cutting. A side wall, for example, which adjoins the cutting blade during cutting is provided, and an optical fiber insertion hole which penetrates in a direction perpendicular to the cutting blade can be provided in this side wall. It is preferable that the optical fiber supporter support the optical fiber on both sides of the blade in order to prevent cleavage of the end surface of the optical fiber and cracking in the axial direction of the optical fiber.

The slower the speed of the movement of the cutting blade is set, the end surface of the optical fiber becomes smooth, and the deterioration of the cutting blade is minimized. However, because when the speed of the movement of the cutting blade is set too slow, naturally the operability decreases, the speed of movement of the cutting blade is set according to the required conditions.

Furthermore, the speed of movement of the cutting blade is also set according to the thickness of the cutting blade. That is, the speed is limited so as not to cause breakage of the cutting blade. Normally, because strength of the cutting blade is reduced in accordance with thinness of the cutting blade, the speed of movement of the cutting blade is set to be lower in accordance with the thinness of the cutting blade to prevent the breakage of the cutting blade.

In order to coordinate the smoothness of the end surface of the optical fiber, the degree of deterioration of the cutting blade, and the operability at a sufficiently high level, if the blade thickness is $\alpha$ (mm) and the speed of movement of the cutting blade when cutting the optical fiber is $\beta$ (mm/minute), then it is preferable that $\alpha$ and $\beta$ fulfill the relationship described by Exp. (1) as described above. It is further preferable that the blade thickness $\alpha$ be 0.5 mm or less, and that the speed of the movement of the cutting blade $\beta$ be 100 mm/minute or less.

In addition, it is preferable that the speed of the movement of the cutting blade be close to constant from the beginning to the end of the cutting, without being influenced by the change in the cutting weight. When the speed of the cutting changes greatly, undulations may be produced on the cutting surface of the optical fiber due to changes in the direction of movement of the cutting blade.

Below, the present invention is explained in detail according to an embodiment.

Figure 2:
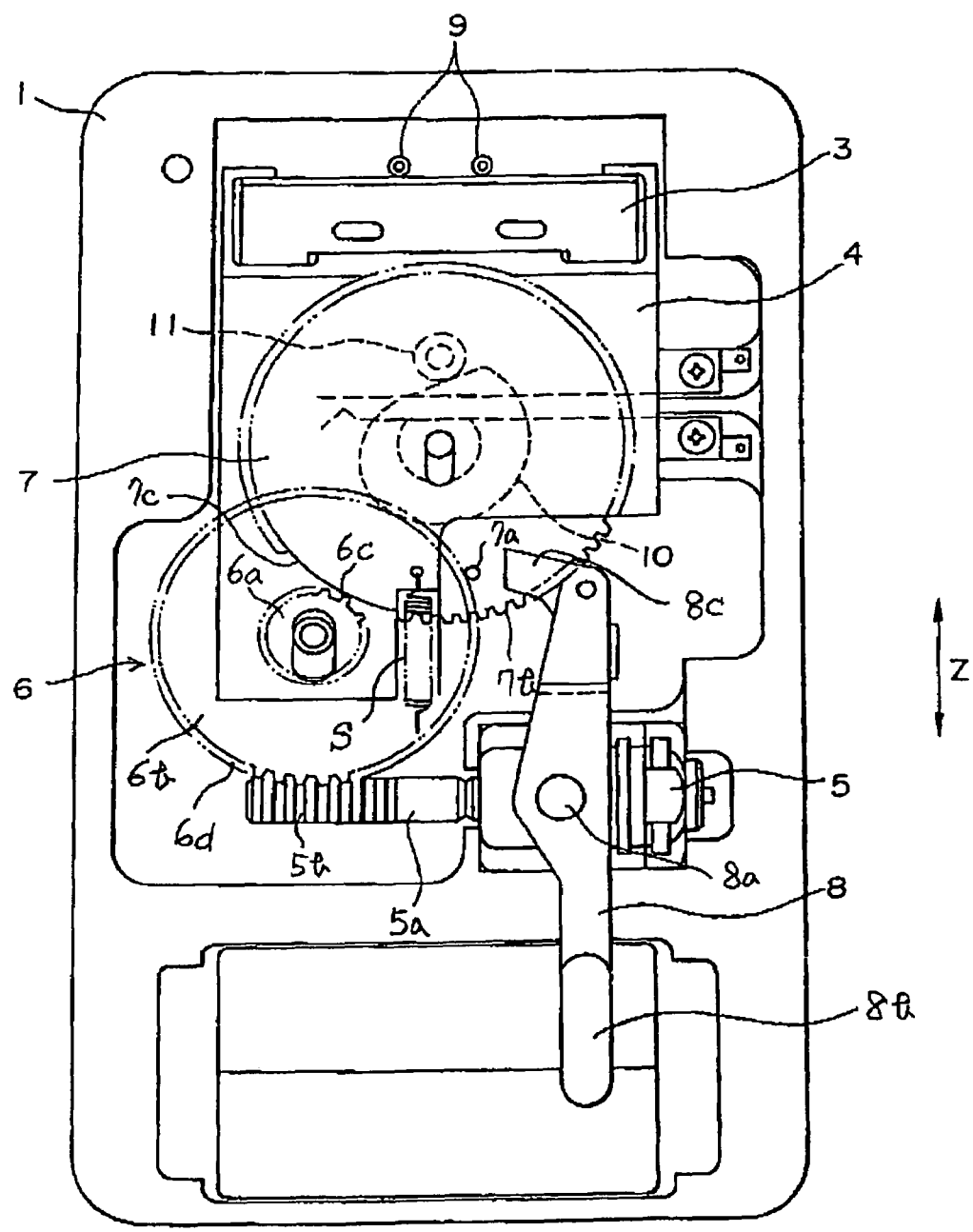
FIG. 2 is a side view of a cross-section of the optical fiber cutting device of the present invention.

FIG. 1 is a top view of a cross-section of an example of the optical fiber cutting device of the present invention, and FIG. 2 is a side view of a cross-section of the example of the optical fiber cutting device of the present invention. Reference numeral 1 is the cutting device body, and 2 is the upper lid. The optical fiber insertion hole (optical fiber supporter) 9 has a diameter about the same size as the diameter of the cross-section of the optical fiber, and because there is sufficient thickness in the direction of the insertion, the inserted optical fiber can be supported so as not to shift during cutting. A slider (cutting blade holder) 4 holds the cutting blade 3. The slider 4 has a structure wherein the cutting blade 3 only moves in the direction of the arrow (the Z direction) along the page surface of FIG. 1 and FIG. 2, and the edge of the blade slides completely across the insertion hole 9.

The trigger lever 8 is maintained in a rotatable state by making an axis of rotation near the center of the lever. One end of the trigger lever 8 protrudes outside the body, and can be manually manipulated, while the other end is along and in contact with the bottom surface of the speed reduction gear (speed reduction part) 7.

More exactly, the trigger lever 8 is rotatably supported to an axis 8a, and its one end 8b is projected from the cutting device body 1, and its other end 8c can be moved along a bottom surface of the speed reducing gear 7.

On the bottom surface of the speed reducing gear 7, a protrusion 7a is provided so as to be pushed by the other end 8c of the trigger lever 8. Furthermore, gear teeth 7b are provided on a part of an outer periphery of the speed reducing gear 7. Whereas, the gear teeth 7b are not provided on the other part of the outer periphery of the speed reducing gear 7 as denoted by reference symbol 7c. That is, the speed reducing gear 7 forms a partially toothed gear.

The speed reducing gear 6 is composed of a small diameter portion 6a and a large diameter portion 6b which is coaxially provided on the small diameter portion 6a. Second gear teeth 6c are provided on an outer periphery of the small diameter portion 6a so as to mesh with the gear teeth 7b, and third gear teeth 6d are provided on an outer periphery of the large diameter portion 6b. The third gear teeth 6d mesh with a worm 5b which are provided around an output shaft 5a of the motor 5.

When the trigger lever 8 is rotated around the axis 8a by pushing its one end 8b, the protrusion 7a provided on the speed reduction gear 7 is pushed by the other end 8c of the trigger lever 8, and the speed reduction gear 7 is forced to rotate at a predetermined angle. By causing the trigger lever 8 to rotate, the second gear teeth 6c of the speed reduction gear 6 and the gear teeth 7b of the speed reduction gear 7 mesh. In this manner, after the speed reduction gears 6 and 7 have meshed, when the switch of the motor 5 is turned on, the drive force of the motor 5 which starts rotating is transmitted to the cam (drive force transmission part) 10 through, in order, the output shaft 5, the speed reduction gear 6 and speed reduction gear 7 as the speed of the drive force is reduced. The cam 10 is disposed on the same axis as the speed reduction gear 7, and rotates along with the rotation of the speed reduction gear 7. The cam follower (drive force transmission part) 11 contacts the cam 10, and is anchored to the slider 4. The arrangement is such that when the cam 10 rotates, the cam 10 pushes the cam follower 11, and accompanying this, the slider 4 moves in the direction of the arrow (the Z direction) on the surface of the page in FIG. 1 and FIG. 2. Then when the optical fiber is inserted into the insertion hole 9, the optical fiber is cut by the cutting blade 3 held by the slider 4.

Furthermore, according to the rotation of the speed reducing gears 6 and 7 which are meshed, the part as denoted by reference symbol 7c of the outer periphery of the speed reducing gear 7 in which the gear teeth 7b are not provided faces to the second gear teeth 6c of the speed reducing gear 6, and the mesh of the speed reducing gears 6 and 7 is released as shown in FIG. 2. Therefore, the rotation of the speed reducing gear 7 and the movement of the cutting blade 3 to the cutting direction are automatically stopped. That is, as a result of rotation of the speed reducing gears 6 and 7, the transmission of the drive force between the motor 5 and the drive force transmission part is automatically stopped. In this state, the cutting blade 3 and the slider 4 are automatically returned to the position prior to the cutting by the force of a spring S which pulls the slider 4.

Using an apparatus such as the one above, the optical fiber was cut using a cutting blade 3 with a blade thickness of 0.1 mm and a blade angle of 10 degrees.

Then the shape of the cam 10 and the speed reduction ratio of the speed reduction gears 6, 7 are set, based on the number of rotations of the motor 5, and as the speed of the movement of the cutting blade fulfills the conditions of Eq. 1 above from the cutting beginning position to the cutting ending position, in the case of this apparatus, the speed of the movement of the cutting blade 3 is set so as to be 40 mm/minute or less. In addition, during cutting, the speed of the movement of the cutting blade 3 is made almost constant, irrespective of its position.

The end surface of the obtained optical fiber is smooth, the cutting blade 3 endures use more than 100 times, and the deterioration of the cutting blade 3 is small. That is, according to the optical fiber cutting device and cutting method of the present invention, the deterioration of the cutting blade 3 is reduced, and a smooth optical fiber cutting surface is obtained stably.

What is claimed is:

1. A method for cutting an optical fiber, comprising:
   moving a cutting blade by applying a drive force provided by a motor so as to transit a center portion of the optical fiber, said drive force being transmitted between a drive force transmission device and said motor through one of a plurality of speed reducing gears configured to reduce a rotational speed of said motor, said one of said plurality of speed reducing gears meshing gear teeth provided on a part of an outer periphery thereof with gear teeth provided on an outer periphery of another one of said plurality of speed reducing gears;
   reducing an amount of the drive force applied to said cutting blade after said cutting blade transits the center portion of said optical fiber by said drive force transmission device to move said cutting blade at a constant speed while cutting the optical fiber; and
   automatically stopping transmission of said drive force to said cutting blade when cutting of the optical fiber is done by having a part of said outer periphery of said one of said plurality of speed reducing gears having no gear teeth facing said gear teeth provided on said outer periphery of said another one of said plurality of speed reducing gears.

2. A method for cutting an optical fiber according to claim 1, wherein the moving step further comprises moving said cutting blade by applying said drive force to a cutting blade holder, said cutting blade holder configured to hold said cutting blade and to receive said drive force from said plurality of speed reducing gears through said drive force transmission device to move said cutting blade.

3. A method for cutting an optical fiber according to claim 2, wherein the applying step further comprises applying said drive force to said cutting blade holder through said drive force transmission device including a cam configured to rotate along with a rotation of said plurality of speed reducing gears, and a cam follower configured to move in a rectilinear direction along with a rotation of said cam.

* * * * *